US009009202B2

(12) United States Patent
Patterson

(10) Patent No.: US 9,009,202 B2
(45) Date of Patent: *Apr. 14, 2015

(54) GARBAGE COLLECTION FOR MERGED COLLECTIONS

(75) Inventor: R. Hugo Patterson, Los Altos, CA (US)

(73) Assignee: EMC Corporation, Hopkinton, MA (US)

(*) Notice: Subject to any disclaimer, the term of this patent is extended or adjusted under 35 U.S.C. 154(b) by 107 days.

This patent is subject to a terminal disclaimer.

(21) Appl. No.: 13/370,260

(22) Filed: Feb. 9, 2012

(65) Prior Publication Data

US 2012/0209820 A1 Aug. 16, 2012

Related U.S. Application Data

(63) Continuation of application No. 12/315,373, filed on Dec. 1, 2008, now Pat. No. 8,140,599.

(60) Provisional application No. 61/005,760, filed on Dec. 7, 2007.

(51) Int. Cl.
*G06F 17/30* (2006.01)
*G06F 12/02* (2006.01)

(52) U.S. Cl.
CPC .................... *G06F 12/0261* (2013.01)

(58) Field of Classification Search
CPC .................... G06F 17/30153; G06F 17/30598; G06F 17/30964

USPC ............................................................ 707/813
See application file for complete search history.

(56) References Cited

U.S. PATENT DOCUMENTS

| | | | | |
|---|---|---|---|---|
| 7,403,949 | B2* | 7/2008 | Cannon et al. | 1/1 |
| 7,788,300 | B2* | 8/2010 | Kuck et al. | 707/813 |
| 7,945,543 | B2* | 5/2011 | Kennedy et al. | 707/696 |
| 7,953,711 | B2* | 5/2011 | Soman et al. | 707/693 |
| 7,953,772 | B2* | 5/2011 | Simeonov et al. | 707/813 |
| 7,962,707 | B2* | 6/2011 | Kaakani et al. | 711/159 |
| 7,975,114 | B2* | 7/2011 | Tene et al. | 711/159 |
| 7,991,807 | B2* | 8/2011 | Rossmann et al. | 707/813 |
| 2007/0294281 | A1* | 12/2007 | Ward et al. | 707/102 |
| 2008/0256143 | A1* | 10/2008 | Reddy et al. | 707/204 |

* cited by examiner

*Primary Examiner* — Hosain T Alam
*Assistant Examiner* — Ahmed Abraham
(74) *Attorney, Agent, or Firm* — Van Pelt, Yi & James LLP

(57) ABSTRACT

A method of identifying nonreferenced memory elements in a storage system is disclosed. A plurality of lists of referenced elements from a plurality of storage subsystems is input. A union of the lists of referenced elements is compiled. The union of the lists of referenced memory elements is compared to a list of previously referenced memory elements to determine previously referenced elements that are no longer referenced. The previously referenced elements that are no longer referenced is output.

20 Claims, 13 Drawing Sheets

| Segment ID | Primary System A | Primary System B | Primary System C | Primary System D | Reference Count |
|---|---|---|---|---|---|
| 0000:0001 | | ✓ | ✓ | ✓ | 3 |
| ~~0000:0002~~ | | | | | ~~0~~ |
| 0000:0004 | | | ✓ | | 1 |
| 0000:0005 | | ✓ | ✓ | | 2 |
| 0000:000A | | | | ✓ | 1 |

| Segment ID | Primary System A | Primary System B | Primary System C | Primary System D | Reference Count |
|---|---|---|---|---|---|
| 0000:0001 | ✓ | ✓ | ✓ | ✓ | 4 |
| 0000:0002 | ✓ | | | | 1 |
| 0000:0004 | | | ✓ | | 1 |
| 0000:0005 | | ✓ | ✓ | | 2 |
| 0000:000A | | | | ✓ | 1 |

FIG. 9

| Segment ID | Primary System A | Primary System B | Primary System C | Primary System D | Reference Count |
|---|---|---|---|---|---|
| 0000:0001 |  | ✓ | ✓ | ✓ | 3 |
| 0000:0002 | ✓ |  |  |  | 1 |
| 0000:0004 |  |  | ✓ |  | 1 |
| 0000:0005 |  | ✓ | ✓ |  | 2 |
| 0000:000A |  |  |  | ✓ | 1 |

FIG. 10

| Segment ID | Primary System A | Primary System B | Primary System C | Primary System D | Reference Count |
|---|---|---|---|---|---|
| 0000:0001 | | ✓ | ✓ | ✓ | 3 |
| ~~0000:0002~~ | | | | | 0 |
| 0000:0004 | | | ✓ | | 1 |
| 0000:0005 | | ✓ | ✓ | | 2 |
| 0000:000A | | | | ✓ | 1 |

FIG. 11

GARBAGE COLLECTION FOR MERGED COLLECTIONS

CROSS REFERENCE TO OTHER APPLICATIONS

This application is a continuation of co-pending U.S. patent application Ser. No. 12/315,373 entitled GARBAGE COLLECTION FOR MERGED COLLECTIONS filed Dec. 1, 2008 which claims priority to U.S. Provisional Patent Application No. 61/005,760 entitled GARBAGE COLLECTION FOR MERGED COLLECTIONS filed Dec. 7, 2007 which are incorporated herein by reference for all purposes.

BACKGROUND OF THE INVENTION

A replica system can be used to recover data when data in a primary system is corrupted or lost. Multiple primary systems can be serviced by a single replica system. For efficiency of storage, both the replica system and the primary systems may be deduplicating systems. In a deduplicating system, incoming data is broken up into segments, and if the segment is already stored on the system, a reference to the already-stored segment is stored instead of storing the segment again.

However, although deduplication can result in a substantial reduction in the amount of space required to store data for a single system, deduplication requires garbage collection to determine which segments are duplicated when deleting data. In addition, more processing may be required for garbage collection in a replica system because for a replica system that replicates data from multiple primary systems there may be additional deduplication possible since an identical segment may be stored on more than one primary system.

BRIEF DESCRIPTION OF THE DRAWINGS

Various embodiments of the invention are disclosed in the following detailed description and the accompanying drawings.

FIG. 9 is a block diagram illustrating an embodiment of a secondary deduplicator segment list.

FIG. 10 is a block diagram illustrating an embodiment of a secondary deduplicator segment list.

FIG. 11 is a block diagram illustrating an embodiment of a secondary deduplicator segment list.

DETAILED DESCRIPTION

Figure 1A:
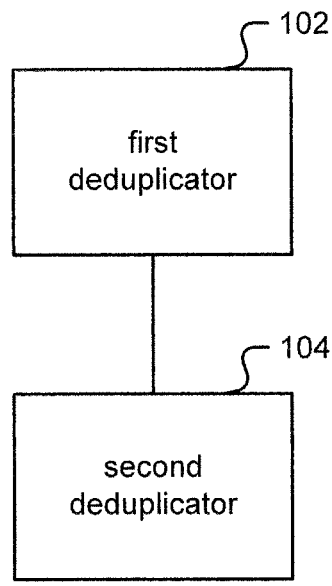
FIG. 1A is a block diagram illustrating an embodiment of cooperating deduplicators.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Determining whether a data segment is a duplicate using cooperating deduplicators is disclosed. In some embodiments, there are two cooperating deduplicators; identical deduplicators—a "primary deduplicator" and a "secondary deduplicator". In some embodiments, there are more than two cooperating deduplicators; a "primary deduplicator", a "secondary deduplicator", a "tertiary deduplicator", and so on, or multiple "primary deduplicators" and a "secondary deduplicator." A data stream, a partial data block, or a full data block is referred to throughout this specification as a "data entity". Each data entity stored on a system is broken up into a plurality of data units referred to throughout this specification as a "segment". A file or data entity is referred to throughout this specification as a "file entity".

In some embodiments, deduplicators are arranged such that the secondary deduplicator avoids operating when the primary deduplicator determines a data segment is a duplicate. A deduplicator, when operating, determines whether a specific data segment is a duplicate based in part on deduplicator information, where deduplicator information comprises a set of references associated with data segments. This deduplicator information is referred to throughout this specification as primary information for a primary deduplicator, secondary information for a secondary deduplicator, and so on. In some embodiments, a segment list is used as this information for a deduplicator.

Preferably, each segment list entry includes segment metadata. In various embodiments, segment metadata includes one or more of: information on segments that are likely to be accessed soon; a mapping between a segment and a file entity; segment location; segment size; segment offset; and a segment identity ("segment ID.") A segment ID is used to uniquely identify the contents of a segment and is derived using a function. The function used to generate a segment ID is implementation dependent. In various embodiments, the segment ID comprises all or a portion of the segment data itself; a digital signature (also referred to as a cryptographic hash or fingerprint) that is generated from the result of a hash function of all or a portion of the segment data, a Rabin fingerprint, a sequential number assigned by the system, or any other appropriate identifier. In some embodiments, a cryptographic hash function such as the MD5 algorithm is used to generate a digital signature. In some embodiments, the fingerprint for a segment in the segment list is grouped in stream order, for example in containers.

In some embodiments, a primary deduplicator forms a contract with a secondary deduplicator to communicate any additions, deletions or modifications to their respective deduplicator's information. This contract enables the cooperating deduplicators to efficiently store segments.

In some embodiments, the primary deduplicator is part of a primary system and the secondary deduplicator is part of a replica system. Throughout this specification, specific examples are given for primary and replica systems that are also applicable to the general case of primary and secondary deduplicators. The primary deduplicator has a primary deduplicator memory within the primary system and the merged collection or memory is within the replica system. Throughout this specification, "memory" refers to any form of data storage including: random access memory (RAM), sequential access memory, dynamic RAM, static RAM, volatile RAM, non-volatile RAM, registers, primary storage, magnetic storage, magnetic discs, magnetic tape, optical storage, optical discs, magneto-optical storage, paper storage, and network storage. Throughout this specification, "merged collection" refers to a collection of merged memory. In some embodiments, the primary deduplicator and secondary deduplicator are both part of one combined system. In the combined system the primary deduplicator may or may not have a primary deduplicator memory, and the merged collection or memory is associated with the secondary deduplicator, all within the combined system.

In some embodiments the primary deduplicator memory is equal or larger than the merged collection or memory. In some embodiments the primary deduplicator memory is smaller than the merged collection or memory, or there is no primary memory at all.

When a new segment is stored in a storage system, it is determined whether the new segment is a duplicate based at least in part on whether it is already referenced by the primary information of the primary deduplicator, for example a primary system segment list. If the primary deduplicator determines that the new segment is not a duplicate, the secondary deduplicator operates. If the secondary deduplicator determines that the new segment is not a duplicate, the new segment is stored with the merged collection or memory.

The primary deduplicator and secondary deduplicator may communicate using references. In some embodiments, the primary deduplicator sends a reference associated with the data segment to the secondary deduplicator that includes an indication whether the data segment was determined to be a duplicate by the primary deduplicator. In some embodiments, the primary deduplicator sends a reference associated with the data segment to the secondary deduplicator that that implies whether the data segment was determined to be a duplicate by the primary deduplicator. For example, a list of segments may be communicated where the absence of segment from the list implies the data segment was determined to be a duplicate.

In some embodiments, the secondary deduplicator keeps track of the number of times that a segment is referred to using a "reference counter." When a segment is referenced for the first time, a reference counter corresponding to the new segment is initialized to one. Each time a given segment is referenced by a primary deduplicator, its replica system reference counter is incremented.

In addition to storing the segments of a primary system, a replica system stores a mapping of segments to file entities, so that the replica system can reconstruct a file entity stored on a primary system if requested to do so.

When a file entity is deleted from a primary system, the segments that are used to reconstruct the file entity may no longer be required to be stored. A segment does not need to be stored if the segment is not required to reconstruct any file entity that is stored on the primary system. When a segment is no longer required to be stored, it is deleted from a primary system. In some embodiments, the process of determining if a segment has no references and deleting the segment is referred to as "garbage collection."

For the replica system, it is necessary to remove the deleted segment if and only if no other primary system that is being replicated by the replica system, or the replica system itself, requires the deleted segment to reconstruct a file entity. The replica system receives an indication that a segment is no longer referenced by a primary system segment list. The replica system determines if the segment is referred to by another primary system whose data is replicated by the replica system. In some embodiments, the replica system reference counter can be used to determine if the segment is referred to by another primary system replicated by the replica system; a segment ID is used to identify the appropriate replica system reference counter; the reference counter is decremented upon receiving an indication that a primary system no longer references the segment corresponding to the segment ID; in the event that the counter is zero after decrementing, then the segment is determined to be no longer referenced by any primary system replicated by the replica system, and the segment can be deleted from the replica system.

FIG. 1A is a block diagram illustrating an embodiment of cooperating deduplicators. A first deduplicator 102 is coupled to a second deduplicator 104. The cooperating deduplicators may be coupled directly or via a public or private network and/or combination thereof—for example, the Internet, an Ethernet, serial/parallel bus, intranet, NAS, SAN, LAN, WAN, and/or other forms or manners of connecting multiple systems and/or groups of systems together.

Figure 1B:
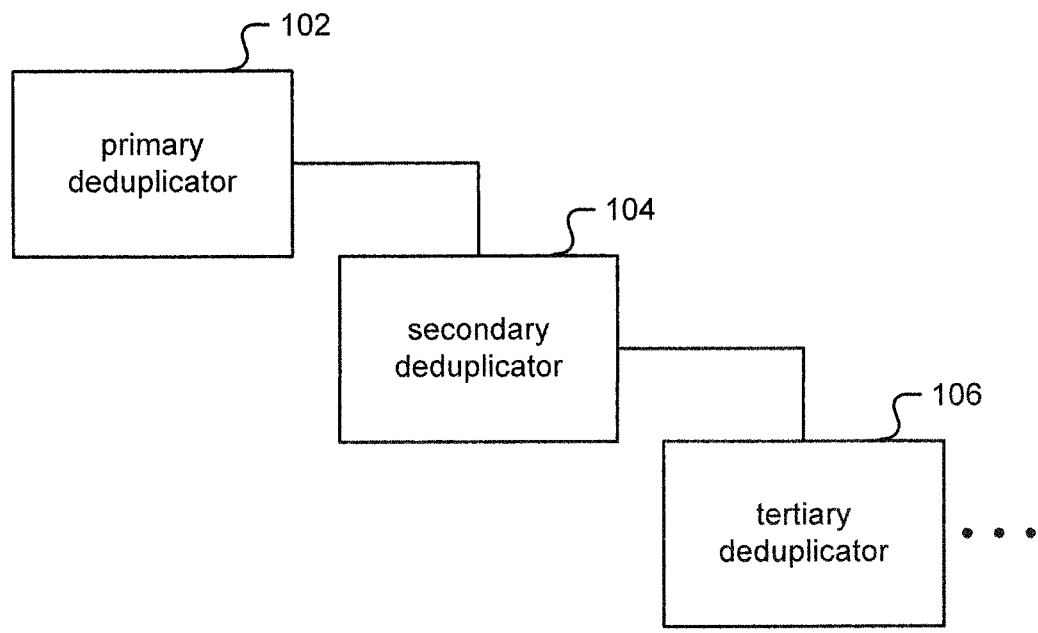
FIG. 1B is a block diagram illustrating an embodiment of an extended set of cooperating deduplicators.

FIG. 1B is a block diagram illustrating an embodiment of an extended set of cooperating deduplicators. In some embodiments a "divide and conquer" strategy is used to arrange deduplicators as an extended cascade. A third deduplicator 106 may thus be selectively operated if a data segment is not determined to be a duplicate by primary deduplicator 102 and secondary deduplicator 104.

Figure 1C:
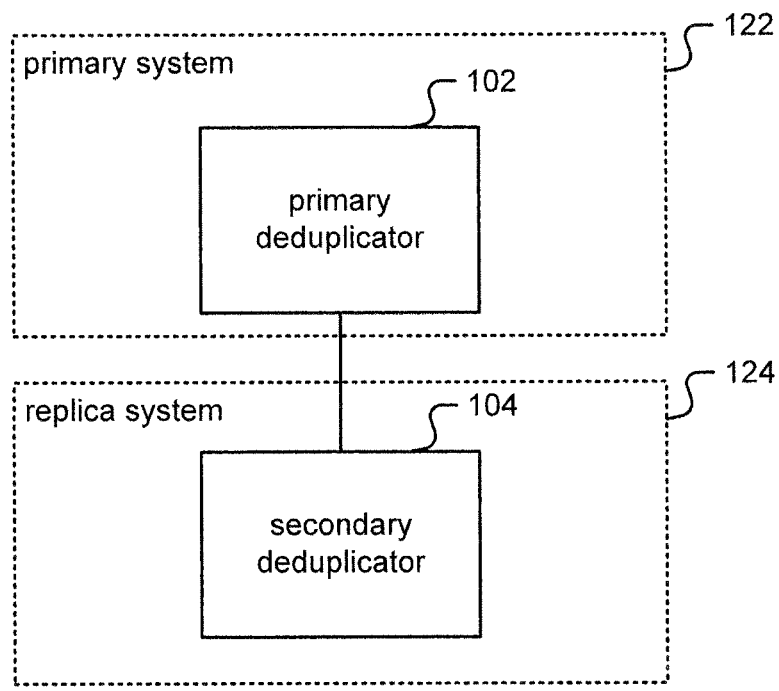
FIG. 1C is a block diagram illustrating the relationship between a primary system and replica system and cooperating deduplicators.
Figure 1D:
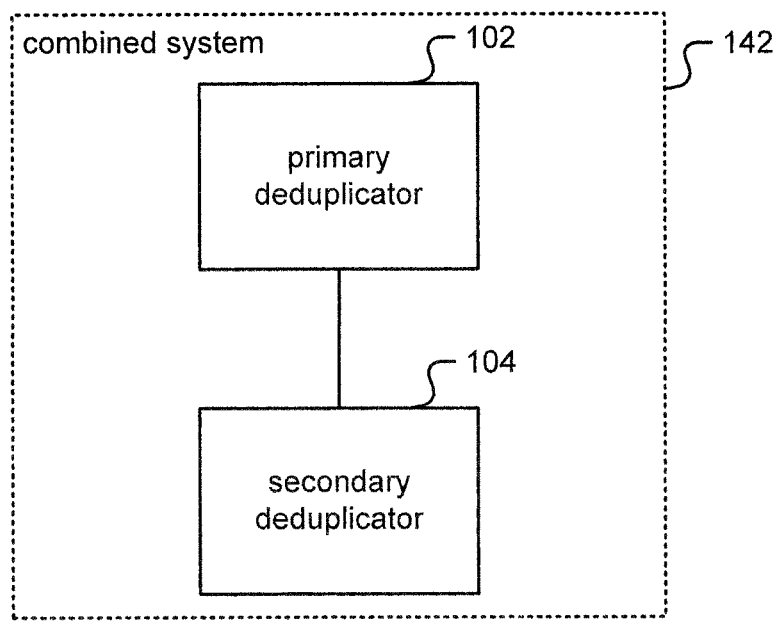
FIG. 1D is a block diagram illustrating the relationship between a combined system and cooperating deduplicators.

FIG. 1C is a block diagram illustrating the relationship between a primary system and replica system and cooperating deduplicators. A primary deduplicator 102 is part of primary system 122. A secondary deduplicator 104 is part of replica system 124. After receiving a segment, the primary deduplicator 102 is operated to determine whether the incoming data segment is a duplicate based on primary information available to the primary deduplicator regarding stored data segments that are stored in a memory. A secondary deduplicator is selectively operated to determine whether the incoming data segment is a duplicate based on secondary information available to the secondary deduplicator, where the selective operation of the secondary deduplicator depends on the determination made by the primary deduplicator FIG. 1D is a block diagram illustrating the relationship between a combined system and cooperating deduplicators. Both primary deduplicator 102 and secondary deduplicator 104 are part of combined system 142.

Figure 1E:
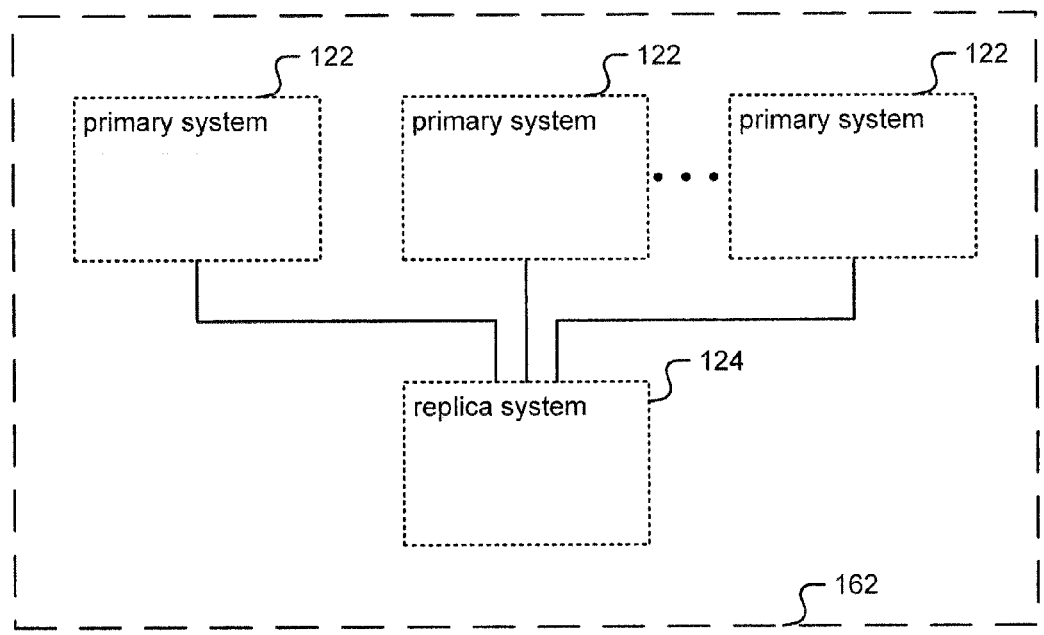
FIG. 1E is a block diagram of a topology for primary system(s) and a replica system.

FIG. 1E is a block diagram of a topology for primary system(s) and a replica system. A plurality of primary systems 122 are coupled directly or through a network to replica system 124 in storage system 162. In this topology the primary deduplicator memory associated with each primary system 122 may be smaller than the merged collection or memory of the replica system 124.

Figure 1F:
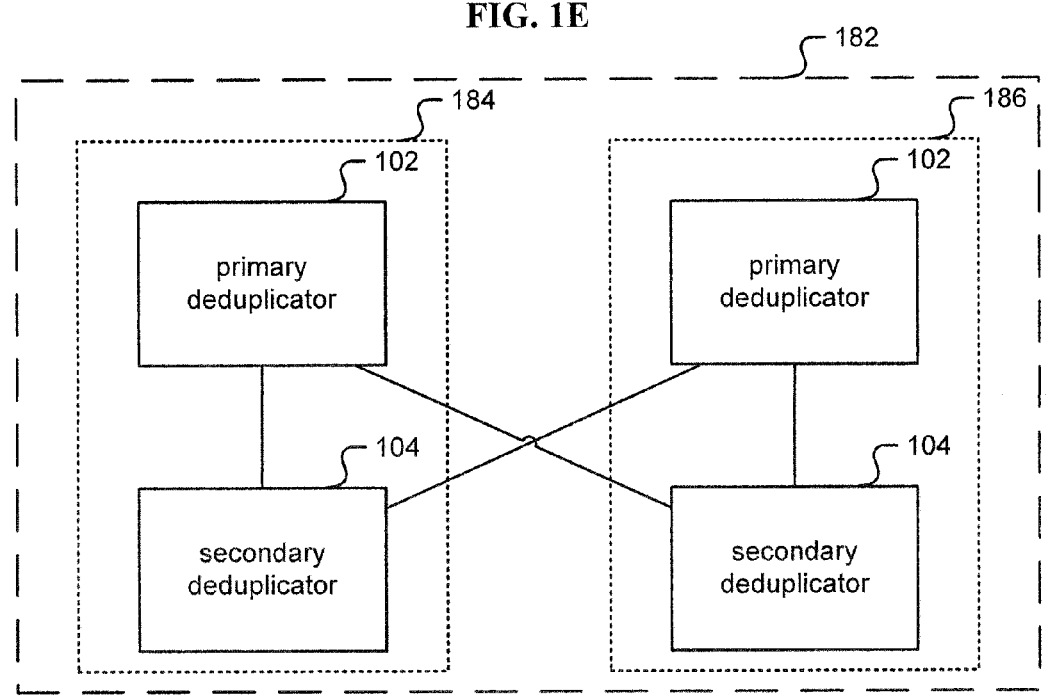
FIG. 1F is a block diagram of a topology for a dual system.

FIG. 1F is a block diagram of a topology for a dual system. The storage system using a dual system 182 is comprised of at least two systems 184, 186 that can be a pair of primary system 122 and replica system 124, or at least two combined systems 142. The primary deduplicator 102 of each system 184, 186 is coupled to both secondary deduplicators 104 of both systems 186, 184. Thus a segment saved locally on one system 184 or saved remotely on the other system 186 will be merged into two single collections with secondary deduplicators 104, in different locations.

Figure 2A:
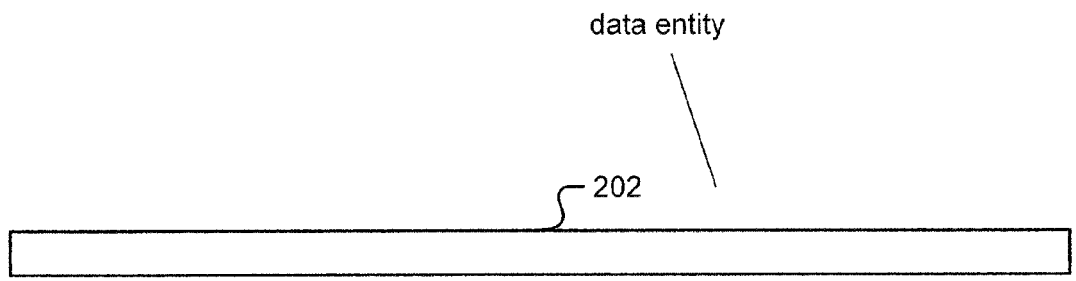
FIG. 2A is a block diagram illustrating an embodiment of a data entity.

FIG. 2A is a block diagram illustrating an embodiment of a data entity. In the example shown, data entity 202 is shown. Data entity 202 can be data that is being backed up, data that is being stored, data that is being replicated on a remote site, or any other appropriate data entity.

Figure 2B:
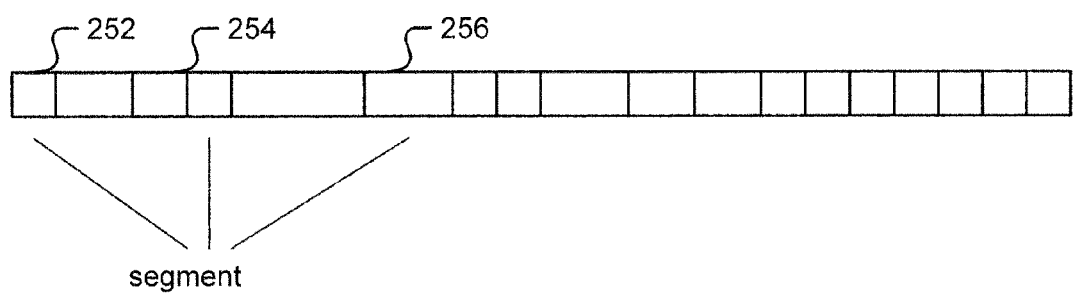
FIG. 2B is a block diagram illustrating an embodiment of a data entity that has been broken into segments.

FIG. 2B is a block diagram illustrating an embodiment of a data entity that has been broken into segments. In the example shown, a data entity is segmented into a plurality of segments—for example, segments 252, 254, and 256. Segmenting of the data entity can use content-based determination of segment boundaries (e.g., hash of content in a window is equal to a value, or hash of content in a window is a minimum or maximum value of the hashes of content of a set of windows), non-content based determination of segment boundaries (e.g., byte count), file entity-based segment boundaries, or any other appropriate way of breaking the data entity into segments. In various embodiments, segments are the same size or are different sizes. In various embodiments, the segments may be non-overlapping or overlapping. In some embodiments, constraints are placed on segment length (e.g., a minimum or maximum segment length).

Figure 3:
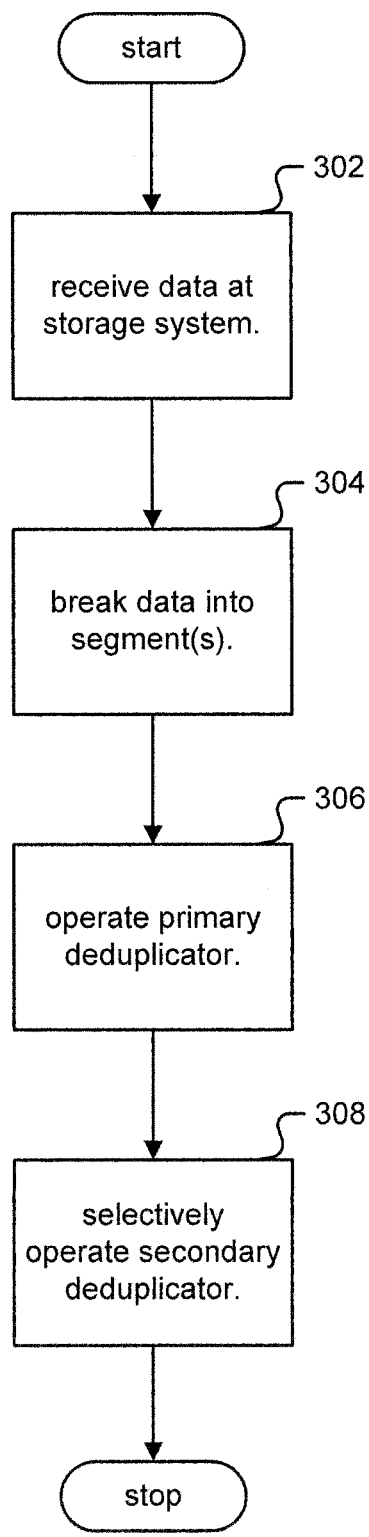
FIG. 3 is a flowchart illustrating an embodiment of a process for processing a segment.

FIG. 3 is a flowchart illustrating an embodiment of a process for processing a segment. In some embodiments, the process of FIG. 3 is implemented in a primary system 122 and replica system 124, or associated with a primary deduplicator 102 and secondary deduplicator 104. In the example shown, in 302, data is received for storage. In some embodiments, the data is created locally or received from another system via a network. In 304, data is broken into segment(s). In 306, each segment is processed by operating the primary deduplicator to deduplicate each segment for storage. In 308, a replica system 124 or secondary deduplicator is selectively operated.

Figure 4:
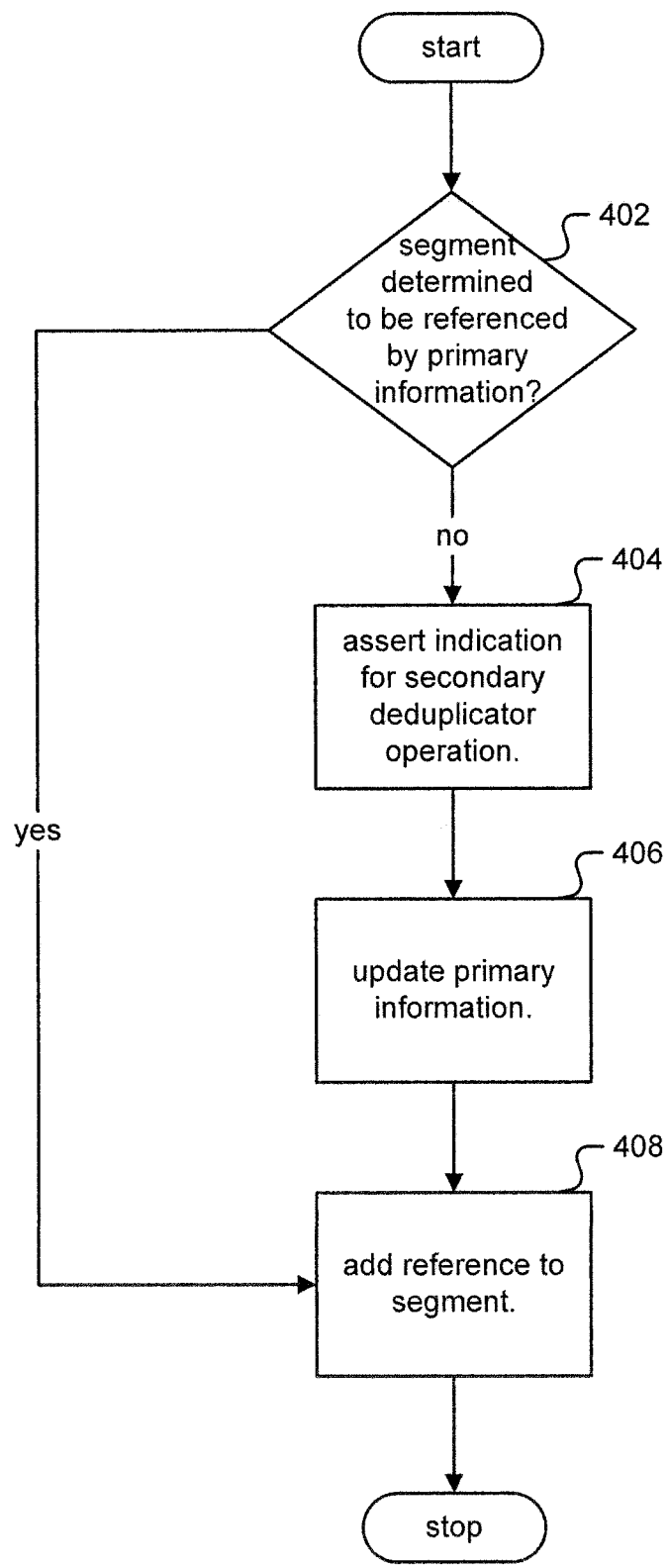
FIG. 4 is a flowchart illustrating an embodiment of a process for processing a new segment with the primary deduplicator.

FIG. 4 is a flowchart illustrating an embodiment of a process for processing a new segment with the primary deduplicator. In some embodiments, the process of FIG. 3 is associated with a primary deduplicator 102. In some embodiments, the process of FIG. 4 implements 306 of FIG. 3 for each new segment. In 402 it is determined if the selected segment is determined to be referenced by primary information. In some embodiments, the determination in 402 is determined by generating the segment ID and comparing the generated segment ID to the segment IDs in the primary information. If the selected segment is already referenced by the primary information, then control is transferred to 408. Otherwise, control is transferred to 404. In 404, an indication is asserted to indicate the segment is to be operated upon by the secondary deduplicator. In 406, the primary information is updated to indicate the new segment is stored within the system.

In some embodiments, the indication is included as part of a list of references to segments sent from the primary deduplicator to the secondary deduplicator. For example, the list "ABCDE" may be sent from the primary deduplicator to the secondary deduplicator for five segments, wherein the indication is asserted for two segments as a flag for segments "B" and "E".

In some embodiments, the primary deduplicator sends an increment to a list of references to segments to the secondary deduplicator, wherein an increment comprises an indication for a new entry to the list. For example, with five segments "ABCDE" the increment "BE" may be sent, wherein the indication is asserted for two segments as a flag for segments "B" and "E".

In some embodiments, the primary deduplicator sends an increment to a list of references to segments to the secondary deduplicator, wherein an increment comprises an indication for an expired entry to the list. For example, with five segments "ABCDE" the increment "ACD" may be sent, wherein the indication is asserted for two segments as a flag for segments "B" and "E".

In 408 metadata is added for the file system to reference the segment. In some embodiments, adding metadata comprises adding a segment's mapping to a file entity and a segment ID to the primary information.

Figure 5:
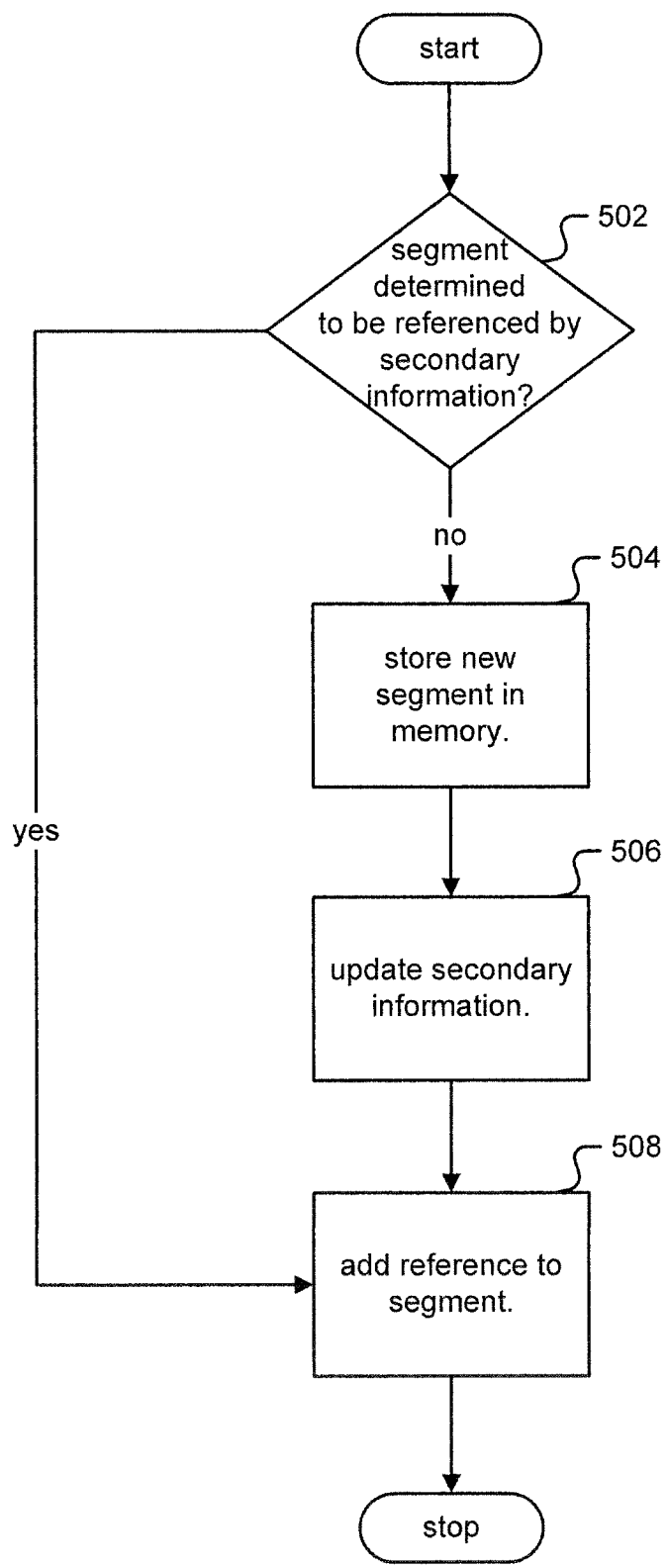
FIG. 5 is a flowchart illustrating an embodiment of a process for processing a new segment with the secondary deduplicator.

FIG. 5 is a flowchart illustrating an embodiment of a process for processing a new segment with the secondary deduplicator. In some embodiments, the process of FIG. 5 is associated with a secondary deduplicator 104. In some embodiments, the process of FIG. 5 implements 308 of FIG. 3 for each segment indicated by 404. In 502, the new segment may be determined to be referenced by the secondary information. In some embodiments, the determination in 502 is determined by generating and comparing the segment ID to the segment IDs in the secondary information. If the new segment is determined to be referenced by the secondary information, then control is transferred to 508. Otherwise, control is transferred to 504. In 504, the new segment is stored in the merged collection or memory associated with the secondary deduplicator. In 506, the secondary information is updated to indicate the new segment is stored within the system. In 506, the replica system stores new segment metadata. In 508 metadata is added for the file system to reference the segment. In some embodiments, adding metadata comprises adding a segment's mapping to a file entity and a segment ID to the secondary information.

Figure 6:
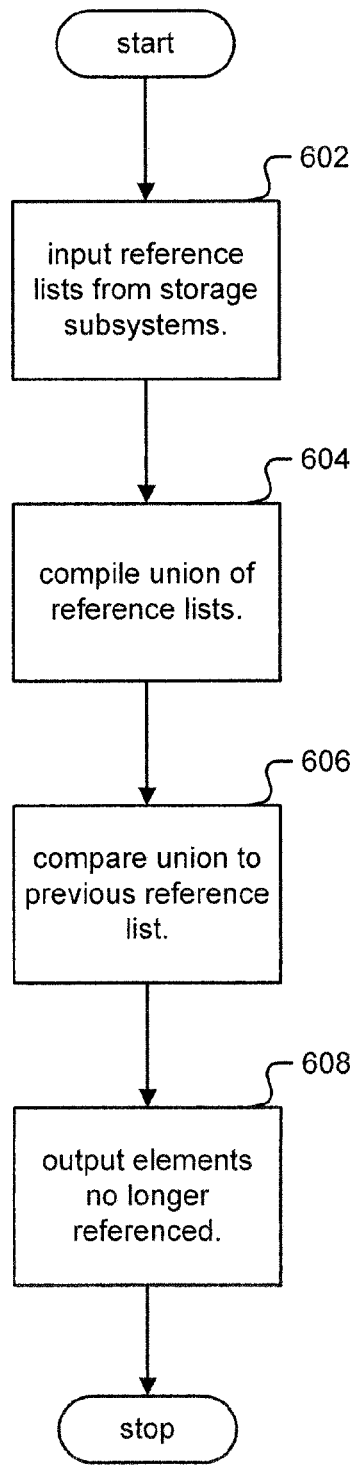
FIG. 6 is a flowchart illustrating an embodiment of a process for deleting.

FIG. 6 is a flowchart illustrating an embodiment of a process for deleting. In some embodiments, the process of FIG. 6 is implemented on a replica system 124. In some embodiments, the process of FIG. 6 is implemented on a combined system 142. In the example shown, an indication to delete data on a primary system is received. In various embodiments, an indication is received from the local primary system, from another system via a network, or from any other appropriate system. In 602, the reference lists from storage subsystems are input. In some embodiments each reference list input is a primary information for a primary deduplicator 102. In some embodiments each reference list input is a segment list for a primary system 122 or a segment list for a primary deduplicator for a combined system 142.

In 604, the union of the reference lists is compiled. In 606, the union compiled in 604 is compared against a previous reference list. In some embodiments the previous reference list is a secondary information for a secondary deduplicator 104. In some embodiments, the previous reference list is a segment list for a replica system 124 or a segment list for a secondary deduplicator for a combined system 142. In 606, each element no longer referenced from the union of reference lists but still remaining in the previous reference list is output. In some embodiments, elements include segments. In some embodiments, outputting an element includes removing the element and information mapping segments to file entities and deleting segments, if appropriate.

Figure 7:
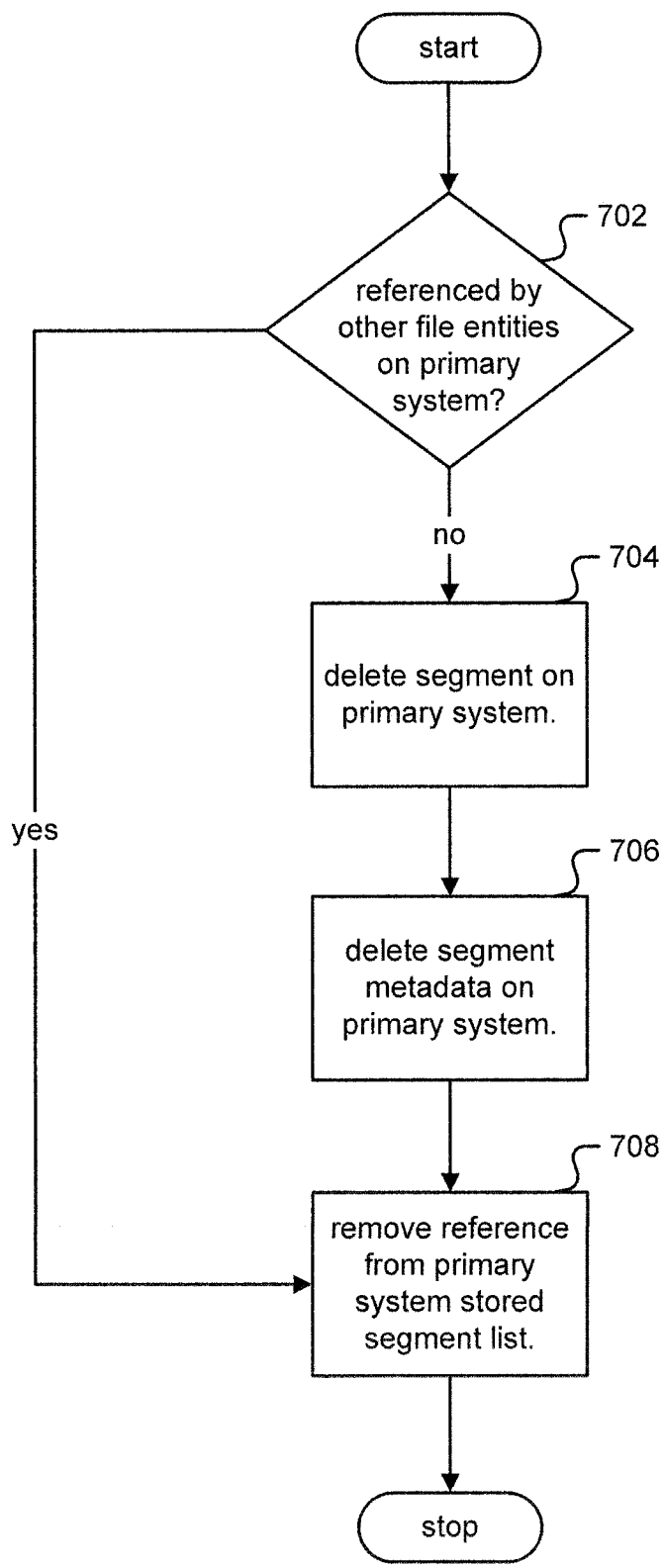
FIG. 7 is a flowchart illustrating an embodiment of a process for processing a deleted segment referenced by a primary deduplicator.

FIG. 7 is a flowchart illustrating an embodiment of a process for processing a deleted segment referenced by a primary deduplicator. In some embodiments, the process of FIG. 7 is implemented in a system with a primary deduplicator such as primary system 122 or combined system 142. Throughout this example we assume a primary system 122, without loss of generality. In the example shown, in 702 it is determined if the selected segment is referenced by other file entities stored by the primary system. In some embodiments, the determination in 702 is determined by generating and comparing the deleted segment ID to the other segment IDs in the primary system segment list. If it is determined that the selected segment is referenced by other file entities stored by the primary system, then control is transferred to 708. Otherwise, control is transferred to 704. In 704, the selected segment is deleted. In 706, segment metadata is deleted. In 708 the reference is removed from the primary system stored list. In some embodiments, removing the segment from the primary system segment list includes removing the deleted segment's file entity mapping and segment ID from the primary system segment list.

Figure 8:
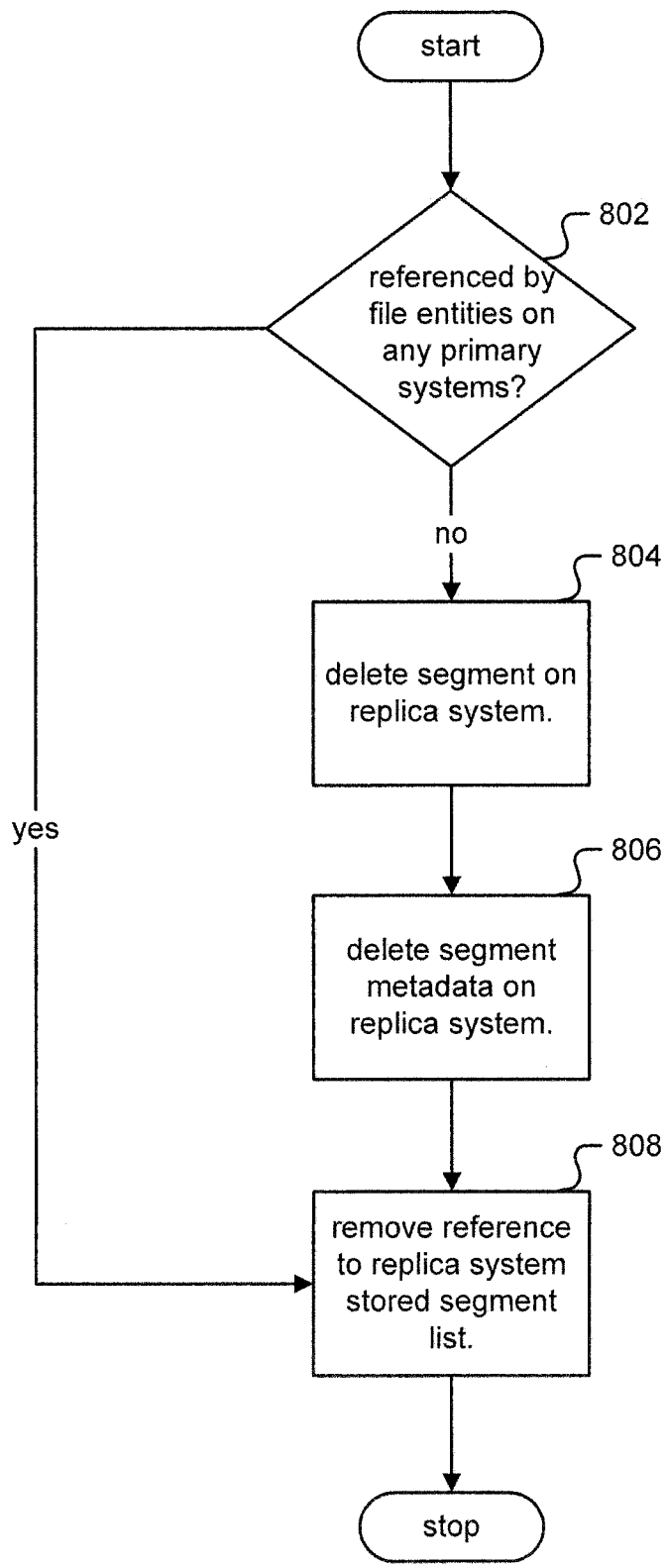
FIG. 8 is a flowchart illustrating an embodiment of a process for processing a deleted segment referenced by a secondary deduplicator.

FIG. 8 is a flowchart illustrating an embodiment of a process for processing a deleted segment referenced by a secondary deduplicator. In some embodiments, the process of FIG. 8 is implemented in a secondary deduplicator system, such as replica system 124 or combined system 142. Throughout this example we assume a replica system 124, without loss of generality. In the example shown, in 802, it is determined if the selected segment is referenced by any file entities on any associated primary system. The reference lists from primary systems associated with the replica system are gathered and the lists are compiled into a union. The union is compared to the existing replica system segment list, for example compared using segment ID of the selected segment to the segment IDs in the replica system segment list. If the selected segment is referenced by any primary system whose segments are replicated by the replica system, then control is transferred to 808. Otherwise, control is transferred to 804. In 804, the selected segment is deleted from the replica system. In 806, segment metadata is deleted. In 808, the selected segment is removed from the replica system segment list, but the selected segment itself may still be stored on the replica system if other primary systems reference it. In some embodiments, removing the selected segment from the replica system segment list includes removing that segment's file entity mapping and segment ID.

FIG. 9 is a block diagram illustrating an embodiment of a secondary deduplicator segment list. In some embodiments, the diagram of FIG. 9 is implemented in a secondary deduplicator system, such as replica system 124 or combined system 142. Throughout this example and the next three figures, we assume a replica system 124, without loss of generality. In the example shown, there are four primary systems—primary system A, primary system B, primary system C, and primary system D—with one replica system. The replica system maintains a replica system segment list.

The replica segment list includes 6 columns: segment ID, primary system A, primary system B, primary system C, primary system D, and reference count. The replica stored list includes 6 rows: column header, segment ID 0000:001, segment ID 0000:002, segment ID 0000:004, segment ID 0000:005, and segment ID 0000:00A. The row of segment ID 0000:0001 includes check marks for primary system A, primary system B, primary system C, primary system D, and a reference count of 4. The check marks indicate that a segment is used to reconstruct data stored on a given primary system. The reference count indicates the number of primary systems that reference the segment with segment ID of a given row.

The row of segment ID 0000:0002 includes a check mark for primary system A and a reference count of 1. The row of segment ID 0000:0004 includes a check mark for primary system C and a reference count of 1. The row of segment ID 0000:0005 includes a check mark for primary system B and primary system C and a reference count of 2. The row of segment ID 0000:000A includes a check mark for primary system D and a reference count of 1.

FIG. 10 is a block diagram illustrating an embodiment of a secondary deduplicator segment list. In the example shown, there are four primary systems—primary system A, primary system B, primary system C, and primary system D—with one replica system. The replica system maintains a replica system segment list. The replica segment list includes 6 columns: segment ID, primary system A, primary system B, primary system C, primary system D, and reference count. The replica stored list includes 6 rows: column header, segment ID 0000:001, segment ID 0000:002, segment ID 0000:004, segment ID 0000:005, and segment ID 0000:00A.

When segment 0000:0001 is deleted from primary system A, the replica system segment list reflects the deleted segment has been removed from primary system A, but still is stored in three other primary systems.

The row of segment ID 0000:0001 includes check marks for primary system B, primary system C, primary system D, and a reference count of 3. The check marks indicate that a segment is used to reconstruct data stored on a given primary system. The reference count indicates the number of primary systems that reference the segment with segment ID of a given row. The row of segment ID 0000:0002 includes a check mark for primary system A and a reference count of 1. The row of segment ID 0000:0004 includes a check mark for primary system C and a reference count of 1. The row of segment ID 0000:0005 includes a check mark for primary system B and primary system C and a reference count of 2. The row of segment ID 0000:000A includes a check mark for primary system D and a reference count of 1.

FIG. 11 is a block diagram illustrating an embodiment of a secondary deduplicator segment list. In the example shown, there are four primary systems—primary system A, primary system B, primary system C, and primary system D—with one replica system. The replica system maintains a replica system segment list. The replica segment list includes 6 columns: segment ID, primary system A, primary system B, primary system C, primary system D, and reference count.

The replica stored list includes 5 rows: column header, segment ID 0000:001, segment ID 0000:004, segment ID 0000:005, and segment ID 0000:00A.

When segment 0000:0002 is deleted from primary system B, the replica system segment list reflects the deleted segment has been removed from primary system B. The segment is not required by the replica system to restore any file entities of any of the primary systems that the replica system is required to replicate. Segment 0000:0002 is therefore removed from replica system segment list.

The row of segment ID 0000:0001 includes check marks for primary system B, primary system C, primary system D, and a reference count of 3. The check marks indicate that a segment is used to reconstruct data stored on a given primary system. The reference count indicates the number of primary systems that reference the segment with segment ID of a given row. The row of segment ID 0000:0004 includes a check mark for primary system C and a reference count of 1. The row of segment ID 0000:0005 includes a check mark for primary system B and primary system C and a reference count of 2. The row of segment ID 0000:000A includes a check mark for primary system D and a reference count of 1.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
   forming a first contract between a cooperating deduplicator and a first primary deduplicator to communicate any additions, deletions, or modifications to their respective deduplicator's information;
   forming a second contract between the cooperating deduplicator and a second primary deduplicator to communicate any additions, deletions, or modifications to their respective deduplicator's information;
   receiving an indication that a data is to be deleted;
   mapping the data to a segment;
   compiling a union of primary segment lists associated with both the first primary deduplicator and the second primary deduplicator at least in part by using the first contract and the second contract, wherein each primary segment list is associated with the segment;
   comparing the union of primary segment lists to a secondary segment list associated with the cooperating deduplicator, wherein the secondary segment list is associated with the segment; and
   using the comparison to identify the segment as no longer referenced by any of the first primary deduplicator and the second primary deduplicator.

2. A method of claim 1, wherein a specific primary segment list comprises a first entry associating the segment with an indication that the segment is referenced by a specific primary system associated with a specific primary deduplicator.

3. A method of claim 2, wherein the entry includes a segment ID for the segment.

4. A method of claim 2, wherein the segment ID comprises a fingerprint for the segment.

5. A method of claim 1, wherein the cooperating deduplicator is associated with a secondary system.

6. A method of claim 5, wherein the secondary system is a replica system for a plurality of primary systems associated with the plurality of primary deduplicators.

7. A method of claim 6, wherein the secondary system and one or more primary systems of the plurality of primary systems is associated with a combined system.

8. A method of claim 1, further comprising removing the identified segment.

9. A method of claim 1, further comprising removing information mapping the identified segment to the data.

10. A method of claim 1, wherein compiling a union comprises using a reference counter associated with the segment.

11. A method of claim 10, wherein the reference counter counts each of a plurality of primary systems that still references the segment, wherein each of the plurality of primary systems are associated with one of the plurality of primary deduplicators.

12. A method of claim 11, wherein the secondary segment list comprises a second entry associating the segment with the reference counter.

13. A method of claim 10, further comprising decrementing the reference counter associated with the segment.

14. A method of claim 10, wherein using comprises identifying the segment as no longer referenced if the reference counter is zero.

15. A method of claim 1, further comprising removing the identified segment from a secondary system associated with the cooperating deduplicator.

16. A method of claim 1, wherein the data is associated with a file entity.

17. A system comprising:
    a first primary deduplicator, wherein the first primary deduplicator comprises a processor;
    a first primary system, associated with the first primary deduplicator;
    a second primary deduplicator;
    a second primary system, associated with the second primary deduplicator;
    a cooperating deduplicator, wherein the cooperating deduplicator is coupled to the first primary deduplicator and the second primary deduplicator and configured to:
       form a first contract with the first primary deduplicator to communicate any additions, deletions, or modifications to their respective deduplicator's information; and
       form a second contract with the second primary deduplicator to communicate any additions, deletions, or modifications to their respective deduplicator's information; and
    a replica system, associated with the cooperating deduplicator, coupled with the first primary deduplicator and the second primary deduplicator, and configured to:
       receive an indication that a data is to be deleted;
       map the data to a segment;
       compile a union of primary segment lists associated with both the first primary deduplicator and the second primary deduplicator at least in part by using the first contract and the second contract, wherein each primary segment list is associated with the segment;
       compare the union of primary segment lists to a secondary segment list associated with the cooperating deduplicator, wherein the secondary segment list is associated with the segment; and
       use the comparison to identify the segment as no longer referenced by any of the first primary deduplicator and the second primary deduplicator.

18. A system of claim 17, wherein a specific primary segment list comprises a first entry associating the segment with an indication that the segment is referenced by a specific primary system associated with a specific primary deduplicator.

19. A computer program product, the computer program product being embodied in a non-transitory computer readable storage medium and comprising computer instructions for:
- forming a first contract between a cooperating deduplicator and a first primary deduplicator to communicate any additions, deletions, or modifications to their respective deduplicator's information;
- forming a second contract between the cooperating deduplicator and a second primary deduplicator to communicate any additions, deletions, or modifications to their respective deduplicator's information;
- receiving an indication that a data is to be deleted;
- mapping the data to a segment;
- compiling a union of primary segment lists associated with both the first primary deduplicator and the second primary deduplicator at least in part by using the first contract and the second contract, wherein each primary segment list is associated with the segment;
- comparing the union of primary segment lists to a secondary segment list associated with the cooperating deduplicator, wherein the secondary segment list is associated with the segment; and
- using the comparison to identify the segment as no longer referenced by any of the first primary deduplicator and the second primary deduplicator.

20. A computer program product of claim 19, wherein a specific primary segment list comprises a first entry associating the segment with an indication that the segment is referenced by a specific primary system associated with a specific primary deduplicator.

* * * * *